Figures 1, 3:
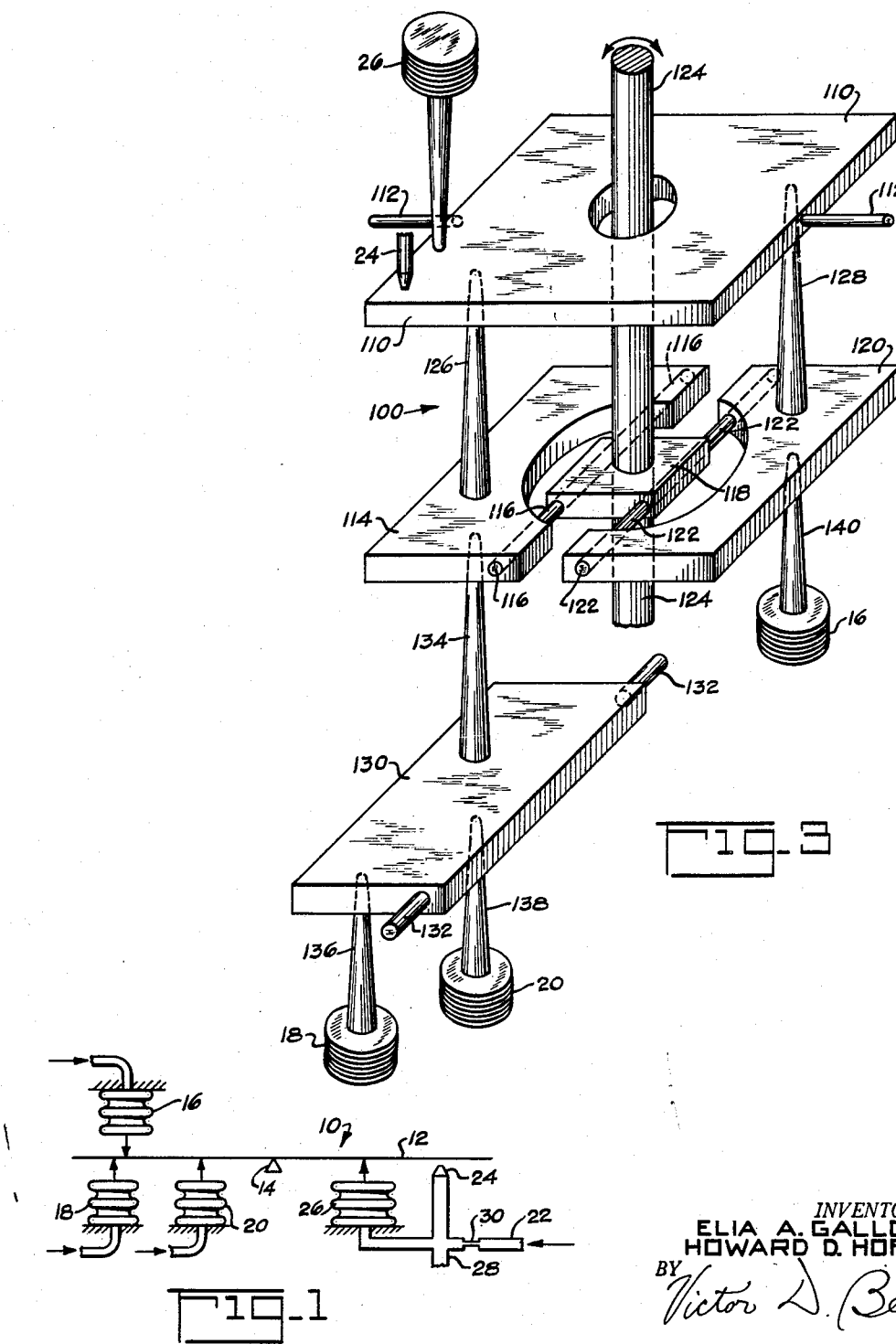

April 20, 1954 E. A. GALLO ET AL 2,675,818
FLUID PRESSURE CONTROL MECHANISM
Filed Dec. 6, 1951 2 Sheets-Sheet 1

INVENTORS
ELIA A. GALLO.
HOWARD D. HOFFMAN
BY Victor D. Behn
ATTORNEY

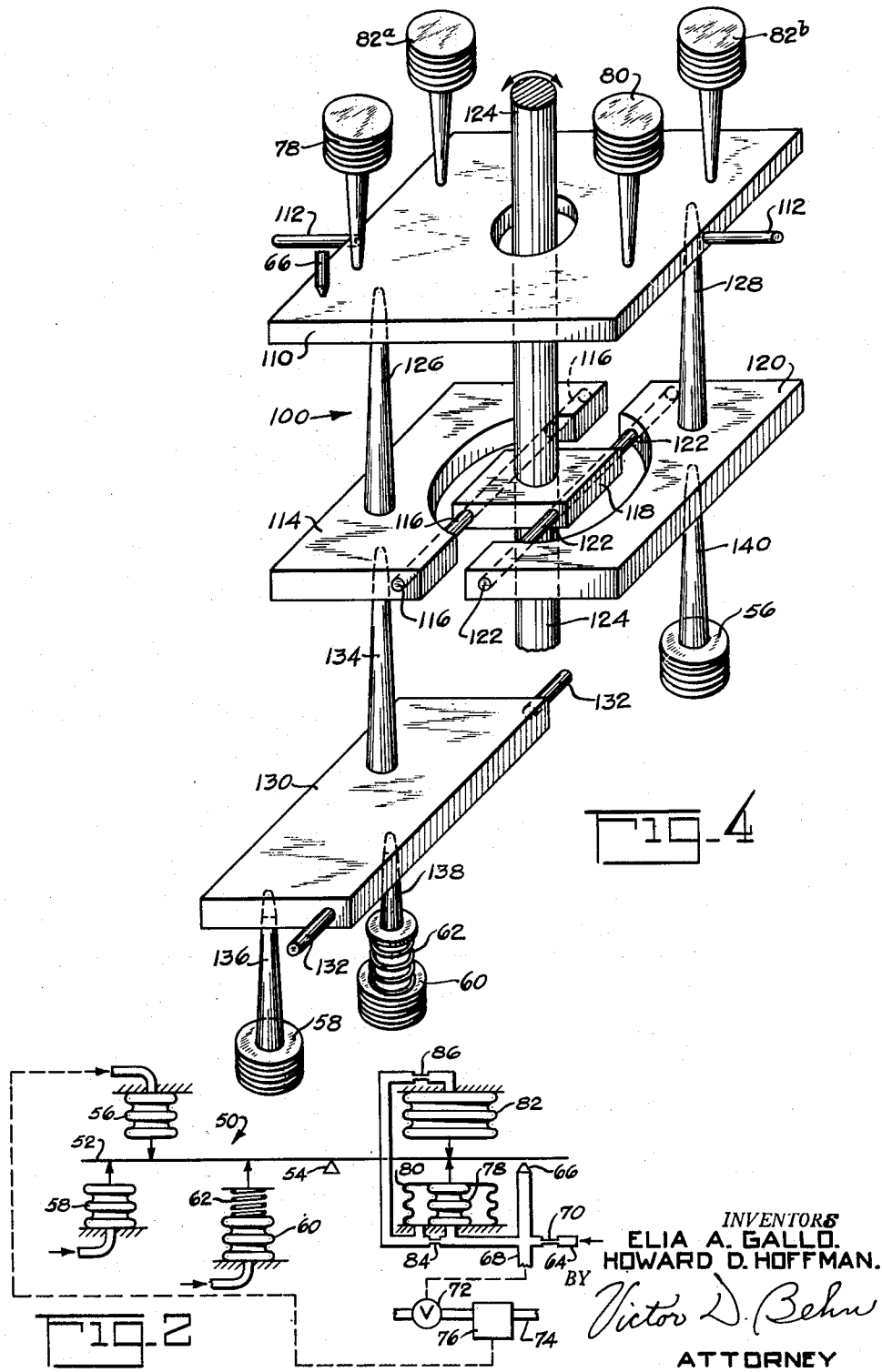

Patented Apr. 20, 1954

2,675,818

UNITED STATES PATENT OFFICE 2,675,818

FLUID PRESSURE CONTROL MECHANISM

Elia A. Gallo, Englewood, and Howard D. Hoffman, Fair Lawn, N. J., assignors to Curtiss-Wright Corporation, a corporation of Delaware Application December 6, 1951, Serial No. 260,287

7 Claims. (Cl. 137—85)

This invention relates to pneumatic control mechanisms providing an output fluid pressure which is a predetermined function of a plurality of input fluid pressures and is particularly directed to such a mechanism in which the forces exerted by said input and output fluid pressures are balanced in such a manner that a change in one or more of the input fluid pressures produces a force unbalance which results in a change in the output pressure to cause said forces to rebalance. Examples of such mechanisms are disclosed in copending application, Serial No. 253,878, filed October 30, 1951.

An object of the present invention is directed to the provision of such a force balanced fluid pressure control mechanism in which the gain of the mechanism can be varied by means of a simple adjustment. By "gain" of such a fluid pressure mechanism is meant a factor which is measured by the ratio of a function of the output pressure of the mechanism to a function of the input pressures producing said output pressure. A further object of the invention comprises the provision of such a fluid pressure mechanism including a novel force balanced lever system in which the gain of the mechanism can be varied by a single adjustment without changing the ratio of the effective moment arms of the input pressures relative to each other. A still further object of the invention comprises the provision of such a force balanced fluid pressure mechanism which is of general application.

Other objects of the invention will become apparent upon reading the annexed detailed description in connection with the drawing in which:

Figs. 1 and 2 are diagrammatic views of fluid pressure devices such as disclosed in said copending application and to which the invention is applicable; and Figs. 3 and 4 are schematic perspective views of a fluid pressure mechanism embodying the invention and illustrated in connection with the devices of Figs. 1 and 2 respectively.

Referring first to Fig. 1 of the drawing, a fluid pressure mechanism 10 comprises a lever 12 pivoted at 14 and subjected to a plurality of forces by means of fluid pressures applied to bellows 16, 18 and 20. The fluid pressures applied to said bellows comprise variable input pressures of the mechanism 10. A source of fluid (such as air) at constant pressure is supplied through a line 22. A nozzle 24, bellows 26 and an output pressure line 28 are in relatively unrestricted communication with each other and they communicate with the supply line 22 through a restricted orifice 30. A portion of the lever 12 overlies the discharge end of the nozzle 24 to act as an air baffle therefor to vary the flow resistance of said nozzle in response to pivotal movements of said lever whereby the output pressure of the mechanism 10 varies with movement of the lever 12 relative to the nozzle 24.

In the mechanism 10, the net turning moment exerted by a plurality of input pressures in the bellows 16, 18 and 20 is balanced against the turning moment exerted by an output pressure in the bellows 26. In addition by means of the nozzle 24 and the cooperating baffle portion of the lever 12, the magnitude of said output pressure is automatically controlled to maintain the system in balance. With such a mechanism, the input pressures are combined to produce an output pressure which is a predetermined function of said pressures. Thus, for example, the mechanism 10 may be similar to the mass air flow measuring mechanism described in said copending application.

A plurality of input pressures may also be balanced against another input pressure to provide an output pressure whose magnitude is effective to control at least one of said input pressures to maintain a predetermined relation between said plurality of input pressures. Such a fluid pressure control mechanism is schematically illustrated in Fig. 2 and is generally designated by reference numeral 50.

Referring now to Fig. 2, the mechanism 50 comprises a lever 52 pivotally supported at 54 and subjected to a plurality of input fluid pressure forces applied to the lever by means of bellows 56 and 58. The forces applied by the bellows 56 and 58 are balanced against another input fluid pressure applied to the lever 52 by a bellows 60 and a compression spring 62 disposed between said bellows and the lever 52. A source of fluid (such as air) at constant pressure is supplied through a line 64. A nozzle 66 and an output pressure line 68 are in unrestricted communication with each other and are in restricted communication with the supply line 64 through a restricted orifice 70. A portion of the lever 52 overlies the discharge end of the nozzle 66 to act as an air baffle therefor. Thus pivotal movements of the lever 52 vary the flow resistance of the nozzle 66 whereby the output pressure of the mechanism 50 varies with movement of said lever relative to said nozzle.

As illustrated, the output pressure line 68 communicates with a device 72 which, for example, may be a valve controlling the flow of a medium in a passage 74 while a device 76 provides a pressure which is a measure of said flow and transmits said pressure to the input bellows 56. Thus the device 50 may be similar to the fuel air ratio controller disclosed in said copending application in which case the input bellows 58 would be provided with a pressure which is a measure of the rate of air supply to a combustion chamber, and the input bellows 56 would be provided with a pressure which is a measure of the rate of fuel supply through the passage 74 to said chamber while the device 72 would increase and decrease said fuel supply rate through said passage 74 with increase and decrease in the output pressure of the mechanism 50 to maintain a predetermined fuel-air ratio as set by the spring 62 which in turn is set by the input pressure applied by the bellows 60.

With the structure of the mechanism 50 so far described, the net turning moment exerted by the input pressure bellows 56 and 58 are balanced against the turning moment exerted by the force of the spring 62 which is set by the input pressure bellows 60. In addition, by means of the nozzle 66 and the cooperating baffle portion of the lever 52, the magnitude of an output pressure in the line 68 is automatically controlled to produce the desired relation between the input pressures as set by the spring 62.

In order to provide a follow-up adjustment of the lever 52, bellows 78, 80 and 82 also act on the lever as illustrated. The bellows 78 is in relatively unrestricted communication with the output pressure line 68 and the bellows 80 communicates with said output line through a restricted orifice 84 while the bellows 82 communicates with said output line through a restricted orifice 86 in series with the orifice 84. The pressure of the bellows 82 opposes the pressure of the bellows 78 and 80 and said belows and their moment arms are such that under static conditions the turning moments exerted by said bellows 78, 80 and 82 balance each other. It can be shown that with the bellows 78, 80 and 82, the instantaneous magnitude of the output pressure of the mechanism 50 not only is a function of the magnitude of the departure of the relation between the input pressures applied to the bellows 56 and 58 from that set by the spring 62 but also is a function of the rate of change of said departure and a function of the time integral of said departure.

In the case of the mechanism 10 (Fig. 1) the output pressure of the line 28 through a bellows applies a force to the lever 12 which balances the forces applied to said lever by a plurality of input pressures. In the case of the mechanism 50 (Fig. 2) the output pressure in the line 68 does not balance the input pressures and instead said output pressure controls a condition of which one of the input pressures is a measure so that a predetermined relation is maintained between said input pressure and one or more other input pressures. The gain of the mechanism 10 can be changed by varying the moment arm of the output pressure bellows 26 and/or by varying the moment arms of the input pressure bellows 16, 18 and 20 so as to maintain constant ratios between said input moment arms. Likewise the gain of the mechanism 50 can be changed by varying the moment arm of the output pressure bellows 78, 80 and 82 and/or by varying the moment arms of the input forces so as to maintain a constant ratio between said input moment arms.

In accordance with the invention a lever mechanism has been provided which is applicable to both of the force balanced fluid pressure mechanisms 10 and 50 and which includes means whereby the gain of the mechanism can be varied with but a single adjustment regardless of the number of input and/or output bellows.

Fig. 3 discloses a specific lever mechanism 100 embodying the invention in connection with the lever force-balanced fluid pressure measuring mechanism of Fig. 1. In Fig. 3 the lever mechanism 100 comprises a lever 110 pivotally supported on trunnions 112. A lever 114 is pivotally supported by trunnions 116 on a rotatively adjustable block 118. Another lever 120 is also pivotally supported on the block 118 by trunnions 122. The pivot axes of the levers 114 and 120 are parallel and the block 118 is secured to a rotatable shaft 124. The axis of the shaft 124 is perpendicular to and passes midway between the parallel pivot axes of the levers 114 and 120. In addition, the axis of the shaft 124 is perpendicular to and intersects pivot axis of the lever 110.

A pin 126 is rigidly secured to the lever 114 and contacts the lever 110. Similarly, a pin 128 is rigidly secured to the lever 120 and contacts the lever 110. As illustrated, the points of engagement of the contact pins 126 and 128 with the lever 110 are on opposite sides of the axis of the shaft 124. Another lever 130 is pivotally supported by trunnions 132 and said lever has a pin 134 contacting the lever 114.

The input and output bellows of Fig. 1 are applied to the lever mechanism 100 through contact pins as illustrated in Fig. 3. Thus the input bellows 18 and 20 act against the lever 130 through contact pins 136 and 138 and the input bellows 16 acts against the lever 120 through a contact pin 140. In addition a portion of the lever 110 overlies the discharge opening of the nozzle 24 to act as an air baffle therefor. The output pressure bellows 26 acts against the lever 110. The fluid pressure connections between the output pressure bellows 26 and the nozzle 24 and between said bellows and nozzle and a source of fluid pressure are the same as illustrated in Fig. 1 but for reasons of clarity of the drawing said connections have not been illustrated in Fig. 3.

With this description of Fig. 3 it is apparent that the input pressure bellows, through the levers 114, 120 and 130, exert turning moments on the lever 110 and that said turning moments are balanced by the turning moment exerted by the output pressure bellows 26 on the lever 110. Accordingly, the operation of Fig. 3 is like that of Fig. 1. In addition the effective moment arms of the input bellows on the lever 110 can be changed by rotating the shaft 124. Thus rotation of the shaft 124 causes a corresponding rotation of the levers 114 and 120 about the axis of said shaft thereby changing the points of engagement of the contact pins 126 and 128 on the lever 110 and the points of engagement of the contact pins 134 and 140 on the levers 114 and 120 respectively.

The points of engagement of the contact pins 126 and 128 with the lever 110 are on opposite sides of the axis of the shaft 124 and are disposed in a plane including said axis. The point of engagement of the contact pin 134 on the lever 114 has the same radius relative to the axis of the shaft 124 as the point of engagement of the contact pin 140 with the lever 120 and said latter two points of engagement are disposed on opposite sides of said axis in a plane including said axis. With this arrangement the moment arms of the forces transmitted by the contact pins 126 and 128 are disposed on opposite sides of the pivot axis of said lever and have a fixed ratio in all rotative positions of adjustment of the shaft 124. In addition the moment arm of the force transmitted by the contact pin 134 to the lever 114 is equal to the moment arm of the force exerted by the contact pin 140 on the lever 120 in all rotative positions of adjustment of the shaft 124. Accordingly, a rotative adjustment of the shaft 124 changes the effective moment arms of the input pressure bellows 16, 18 and 20 on the lever 110 without changing the ratio of these moment arms to each other. In other words the gain of the fluid pressure mechanism of Fig. 3 can be changed with but a single rotative adjustment of the shaft 124 notwithstanding the many forces and turning moments involved.

Because of the spacing of the pivot axes of the levers 114 and 120, in order that a rotative adjustment of the shaft 124 have no effect on the ratio of the input moment arms to each other it is necessary that the point of application of the contact pin 140 on the lever 120 have the same radius relative to the axis of the shaft 124 as the point of application of the contact pin 134 on the lever 114 as well as being disposed on opposite sides of said axis in a plane including said axis. If however, the pivot axes of the levers 114 and 120 were made coincidental through the axis of the shaft 124, then it would only be necessary that said points be disposed on opposite sides of the axis of the shaft 124 in a plane including said axes and it would no longer be necessary that said points be at the same radial distance from the axis of the shaft 124.

The lever mechanism 100 is not limited to use with the specific force-balanced lever measuring system of Fig. 1 as in Fig. 3. For example, any number of input bellows could act on the lever 130. In addition if there are only two input bellows then the lever 130 could be eliminated in which case one of said input bellows would act on the lever 114 and the other on the lever 120. In all such variations the gain of the fluid pressure mechanism can be changed with but a single adjustment, namely a rotative adjustment of the shaft 124.

As illustrated in Fig. 4, the lever mechanism 100 can also be used with the force-balanced lever control system of Fig. 2. Accordingly the lever mechanism in Fig. 4 is identical with and has been designated by the same reference numerals as the lever mechanism 100 of Fig. 3. Therefore no detailed description of the lever mechanism 100 is necessary in connection with Fig. 4. The force applying bellows and spring of Fig. 4 have been designated by the same reference numerals as the force applying bellows and spring of Fig. 2 except the bellows 82 has been split into two bellows 82a and 82b in unrestricted communication with each other to provide a symmetrical arrangement of the output bellows. It should be noted that the moment arms of the output bellows need not be identical as illustrated in Fig. 2 provided the net turning moment of said output bellows on the lever 110 is equal to zero when the system is balanced.

The operation of the force-balanced lever control mechanism of Fig. 4 obviously is like that of Fig. 2. In addition in Fig. 4 the gain of the mechanism can be changed merely by a rotative adjustment of the control shaft 124.

It should now be apparent that the lever mechanism 100 is of general application to any lever force-balanced fluid pressure system and that in all such applications the gain of the system can be changed as desired by means of a single rotative adjustment. Preferably each of the levers of the mechanism 100 should be statically balanced about their pivot axis, although for reasons of clarity of the drawing the levers have not been so illustrated.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. A fluid pressure mechanism comprising a lever assembly including first, second and third levers; means operatively connecting said first lever to said third lever for applying a force to said third lever exerting a turning moment on said third lever in one direction about the pivot axis of said third lever; means operatively connecting said second lever to said third lever for applying a force to said third lever exerting a turning moment on said third lever in the opposite direction about the pivot axis of said third lever; means for applying a plurality of fluid pressures to said first and second levers determining the magnitudes of said forces; adjustable means rotatable about an axis perpendicular to the pivot axis of said third lever for varying the moment arms of said forces on said third lever such that the ratio of said moment arms is constant; and means providing an output fluid pressure which changes in response to movements of said third lever.

2. A fluid pressure mechanism comprising a lever assembly including first, second and third levers; means operatively connecting said first lever to said third lever for applying a first force to said third lever exerting a turning moment on said third lever in one direction about the pivot axis of said third lever; means operatively connecting said second lever to said third lever for applying a second force to said third lever exerting a turning moment on said third lever in the opposite direction about the pivot axis of said third lever; means for applying a plurality of fluid pressures to said first and second levers determining the magnitudes of said forces; adjustable means for rotating said first and second levers and their respective operative connections to said third lever about an axis perpendicular to the pivot axis of said third lever; and means providing an output fluid pressure which changes in response to movements of said third lever.

3. A fluid pressure mechanism comprising a lever assembly including first, second and third levers; means operatively connecting said first lever to said third lever for applying a first force to said third lever exerting a turning moment on said third lever in one direction about the pivot axis of said third lever; means operatively connecting said second lever to said third lever for applying a second force to said third lever exerting a turning moment on said third lever in the opposite direction about the pivot axis of said third lever; means for applying a plurality of fluid pressures to said first and second levers determining the magnitudes of said forces; adjustable means for rotating said first and second levers and their respective operative connections to said third lever about an axis perpendicular to and intersecting the pivot axis of said third lever for varying the moment arms of said forces on said third lever such that the ratio of said moment arms is constant; and means providing an output fluid pressure which changes in response to movements of said third lever.

4. A fluid pressure mechanism comprising a lever assembly including first, second and third levers; means secured to said first lever and engaging said third lever for applying a first force to said third lever exerting a turning moment on said third lever in one direction about the pivot axis of said third lever; means secured to said second lever and engaging said third lever for applying a second force to said third lever exerting a turning moment on said third lever in the opposite direction about the pivot axis of said third lever; means for applying a plurality of fluid pressures to said first and second levers determining the magnitudes of said forces; adjustable means rotatable about an axis perpendicular to the pivot axis of said levers and intersecting the axis of said second lever; means pivotally mounting said first and second levers on said adjustable means about parallel axes so that rotation of said adjustable means effects movement of said points of application of said first and second forces on said third lever to vary the moment arms of said forces relative to the pivot axis of said third lever, the points of application of said first and second forces on said third lever being disposed on opposite sides of said axis of adjustment in a plane including said axis so that the ratio of the moment arms of said first and second forces relative to the pivot axis of said third lever remains constant in all positions of adjustment of said rotatable means; and means providing an output fluid pressure which changes in response to movements of said third lever.

5. A fluid pressure mechanism comprising a lever assembly including first, second, third and fourth levers; means for subjecting said first lever to a plurality of forces each exerting a turning moment on said first lever about its pivot axis; means operatively connecting said first lever to said second lever for applying a force to said second lever exerting a turning moment thereon about its pivot axis in response to the forces acting on said first lever; means secured to said second lever and engaging said fourth lever for applying a first force thereon exerting a turning moment in one direction about the pivot axis of said fourth lever in response to said force applied to said second lever; means for applying a force to said third lever exerting a turning moment thereon about its pivot axis; means secured to said third lever and engaging said fourth lever for applying a second force thereon exerting a turning moment about the pivot axis of said fourth lever in response to said force applied to said third lever and in a direction opposite to that exerted by said first force; adjustable means rotatable about an axis perpendicular to and intersecting the pivot axis of said fourth lever; means pivotally supporting said second and third levers on said rotatable adjustable means about parallel axes perpendicular to and symmetrically disposed relative to said axis of adjustment so that rotation of said adjustable means effects movement of said points of application of said first and second forces relative to said fourth lever to vary the moment arms of said forces relative to the pivot axis of said fourth lever, the points of application of said first and second forces on said fourth lever being disposed on opposite sides of said axis of adjustment in a plane including said axis so that the moment arms of said first and second forces relative to the pivot axis of said fourth lever are equal in all positions of adjustment of said rotatable means; and means providing an output fluid pressure which changes in response to movements of said fourth lever.

6. A fluid pressure mechanism comprising a lever assembly including first, second, third and fourth levers; means for subjecting said first lever to a plurality of forces each exerting a turning moment on said first lever about its pivot axis; means operatively connected to said first lever and engaging said second lever for applying a first force to said second lever exerting a turning movement thereon about its pivot axis in response to the forces acting on said first lever; means secured to said second lever and engaging said fourth lever for applying a second force thereon exerting a turning moment in one direction about the pivot axis of said fourth lever in response to said first force; means engaging said third lever for applying a third force thereon exerting a turning moment thereon about its pivot axis; means secured to said third lever and engaging said fourth lever for applying a fourth force thereon exerting a turning moment about the pivot axis of said fourth lever in response to said third force and in a direction opposite to that exerted by said second force; adjustable means rotatable about an axis perpendicular to and intersecting the pivot axis of said fourth lever; means pivotally supporting said second and third levers on said rotatable adjustable means about parallel axes perpendicular to and symmetrically disposed relative to said axis of adjustment so that rotation of said adjustable means effects movement of said points of application of said first, second, third and fourth forces on their respective levers to vary the moment arms of said forces relative to said levers, the points of application of said second and fourth forces on said fourth lever being disposed on opposite sides of said axis of adjustment in a plane including said axis and the points of application of said first and third forces on said second and third levers, respectively, being disposed on opposite sides of said axis of adjustment in a plane including said axis so that the ratio of the moment arms of said first and third forces on their respective levers is constant in all positions of adjustment of said rotatable means; and means providing an output fluid pressure which changes in response to movements of said fourth lever.

7. A fluid pressure mechanism comprising a lever assembly including first, second, third and fourth levers; means for subjecting said first lever to a plurality of forces each exerting a turning moment on said first lever about its pivot axis; means operatively connected to said first lever and engaging said second lever for applying a first force to said second lever exerting a turning moment thereon about its pivot axis in response to the forces acting on said first lever; means secured to said second lever and engaging said fourth lever for applying a second force thereon exerting a turning moment in one direction about the pivot axis of said fourth lever in response to said first force; means engaging said third lever for applying a third force thereon exerting a turning moment thereon about its pivot axis; means secured to said third lever and engaging said fourth lever for applying a fourth force thereon exerting a turning moment about the pivot axis of said fourth lever in response to said third force and in a direction opposite to that exerted by said second force; adjustable means rotatable about an axis perpendicular to and intersecting the pivot axis of said fourth lever; means pivotally supporting said second and third levers on said rotatable adjustable means about parallel axes perpendicular to and equally spaced from and disposed on opposite sides of said axis of adjustment so that rotation of said adjustable means effects movement of said points of application of said first, second, third and fourth forces on their respective levers to vary the moment arms of said forces relative to said levers, the points of application of said second and fourth forces on said fourth lever being disposed on opposite sides of said axis of adjustment in a plane including said axis and the points of application of said first and third levers on said second and third levers, respectively, being equally spaced from and disposed on opposite sides of said axis of adjustment in a plane including said axis; and means providing an output fluid pressure which changes in response to movements of said fourth lever.

References Cited in the file of this patent

UNITED STATES PATENTS

| Number | Name | Date |
|---|---|---|
| 1,987,200 | Mabey | Jan. 8, 1935 |
| 2,369,463 | Ibbott | Feb. 13, 1945 |
| 2,409,871 | Krogh | Oct. 22, 1946 |

FOREIGN PATENTS

| Number | Country | Date |
|---|---|---|
| 536,537 | Great Britain | May 19, 1941 |
| 568,634 | Great Britain | Apr. 13, 1945 |